United States Patent [19]

Schnoor

[11] Patent Number: 5,371,945
[45] Date of Patent: Dec. 13, 1994

[54] METHOD OF MAKING A TUBULAR COMBUSTION CHAMBER CONSTRUCTION

[75] Inventor: Richard J. Schnoor, Jupiter, Fla.

[73] Assignee: United Technologies Corporation, Hartford, Conn.

[21] Appl. No.: 812,345

[22] Filed: Dec. 23, 1991

[51] Int. Cl.5 .............................................. B23P 15/00
[52] U.S. Cl. ................. 29/890.1; 29/890.038; 165/170
[58] Field of Search ................. 29/890.01, 890.038, 29/890.04, 890.012, 890.043, 890.054; 165/170, 166, 134.1; 228/193, 195, 183, 181

[56] References Cited

U.S. PATENT DOCUMENTS

| | | | |
|---|---|---|---|
| 2,958,183 | 11/1960 | Seigelman | 29/890.01 |
| 3,069,850 | 12/1962 | Ledwith et al. | 29/890.01 |
| 3,086,358 | 4/1963 | Tunavicus | 29/890.01 |
| 3,190,070 | 6/1965 | Neu, Jr. | 29/890.01 |
| 3,224,678 | 12/1965 | Rosman | 29/890.01 |
| 3,349,464 | 10/1967 | Becker, Jr. et al. | 29/890.01 |
| 3,690,103 | 9/1972 | Dedeira et al. | 29/890.01 |
| 3,714,695 | 2/1973 | Beeson | 29/890.01 |
| 3,897,316 | 7/1975 | Huang | 29/890.01 |
| 4,531,271 | 7/1985 | Lechner et al. | 29/890.01 |
| 4,942,653 | 7/1990 | Hawkinson | 29/890.01 |

*Primary Examiner*—Irene Cuda
*Attorney, Agent, or Firm*—Christopher T. Hayes

[57] ABSTRACT

A method of producing a tubular structure, such as a rocket thrust chamber, includes positioning cooling tubes about an inner tooling fixture to form a tube bundle, and positioning a segmented outer tooling fixture about the tube bundle thereby sandwiching the tubes between the inner tooling fixture and the outer tooling fixture. The tubes are then pressurized at high temperature and the inner tooling fixture, outer tooling fixture and tube bundle are heated to a temperature at which each of the tubes bonds to adjacent tubes.

15 Claims, 9 Drawing Sheets

METHOD OF MAKING A TUBULAR COMBUSTION CHAMBER CONSTRUCTION

DESCRIPTION

1. Field of the Invention

This invention is related to rocket chambers and particularly to a process and apparatus for forming such chambers.

2. Background of the Invention

Rocket engines, such as those used on space missions, are costly to design and manufacture. In addition, there is a continuing and growing need for rockets capable of carrying payloads to space or near-Earth orbits. Consequently, manufacturers of such rocket engines are constantly seeking new ways to reduce the cost of producing the components which go into a rocket engine.

One such component is the rocket thrust chamber within which the propellants of the rocket engine are mixed, combusted and accelerated. Because of the extremely high temperatures of the propellants moving through the thrust chamber, the walls of the thrust chamber must be cooled in those applications which require sustained engine firings. Such cooling is typically accomplished by flowing a coolant through tubes or channels which form the inner surface of the thrust chamber.

A typical example of such thrust chambers is shown in U.S. Pat. No. 3,208,132 to Escher, which discloses a rocket chamber produced by forming coolant flow passages within two sheets by an explosive forming process. The formed sheets must be subsequently welded or brazed together to form individual flow passages, and the integrity of these welds is difficult to inspect. U.S. Pat. No. 3,190,070 to Neu discloses a rocket chamber formed from a plurality of pre-formed coolant tubes. The tubes must be manufactured to close tolerances to ensure that the resulting tube bundle adequately shields the structural jacket of the chamber from the combustion products. U.S. Pat. No. 3,595,025 to Stockel et al discloses a rocket chamber liner having grooves which, when mated with a structural jacket, form cooling channels. These grooves must be machined into the liner, and therefore require a significant amount of labor to produce.

What is needed is a method of making a tubular structure, such as a rocket thrust chamber, which permits less exacting tube tolerances, and is less labor intensive, than the prior art, and is readily inspectable.

SUMMARY OF THE INVENTION

It is therefore an object of the present invention to provide a process for forming a tubular structure, such as a rocket thrust chamber, which provides for secure bonds between adjacent coolant tubes and a simple manufacturing technique.

According to the present invention, a plurality of tubes are placed side by side against a first tooling fixture forming a tube bundle about the fixture. Each end of each tube is sealed to a manifold, and a second tooling fixture is positioned around the tube bundle. Each of the fixtures is coated with a release agent to prevent bonding of the tubes to the fixtures. The tubes are then pressurized and the fixtures and tubes are heated to a temperature at which the tubes are subject to plastic deformation. The tubes expand and deform into contact with the adjacent tubes, the outer surface of the first fixture, and the inner surface of the second fixture. The pressure and temperature are maintained until the tubes have bonded to each other; bonding to the fixtures is prevented by the release agent. The fixtures and tubes are then cooled back to room temperature and the pressure is reduced to ambient. The fixtures are then removed from the tube bundle, yielding the completed tubular structure.

The foregoing and other features and advantages of the present invention will become more apparent from the following description and accompanying drawings.

BEST MODE FOR CARRYING OUT THE INVENTION

Figure 1:
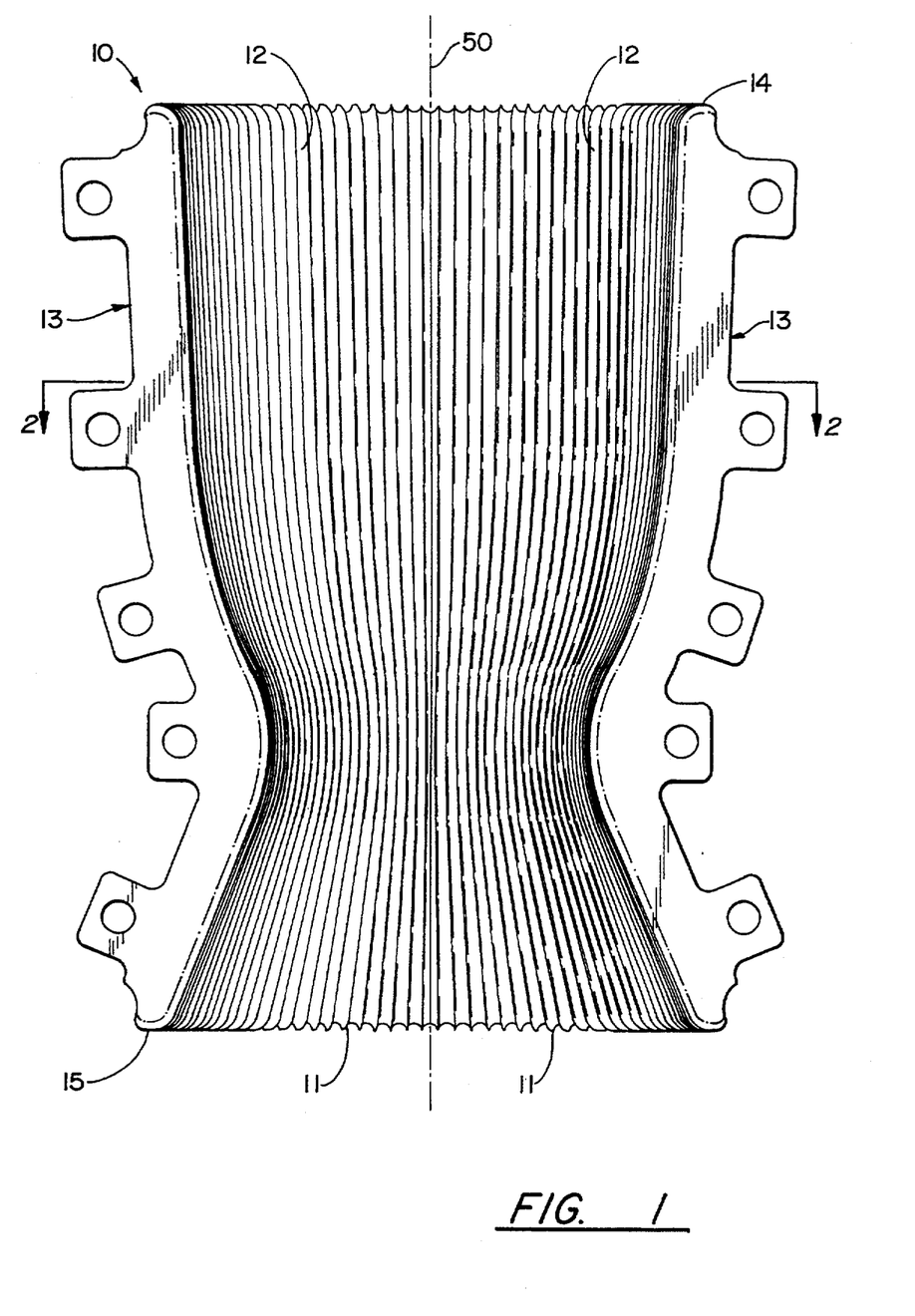
FIG. 1 is a cross-sectional view of half of the outer tooling fixture of the present invention.
Figure 2:
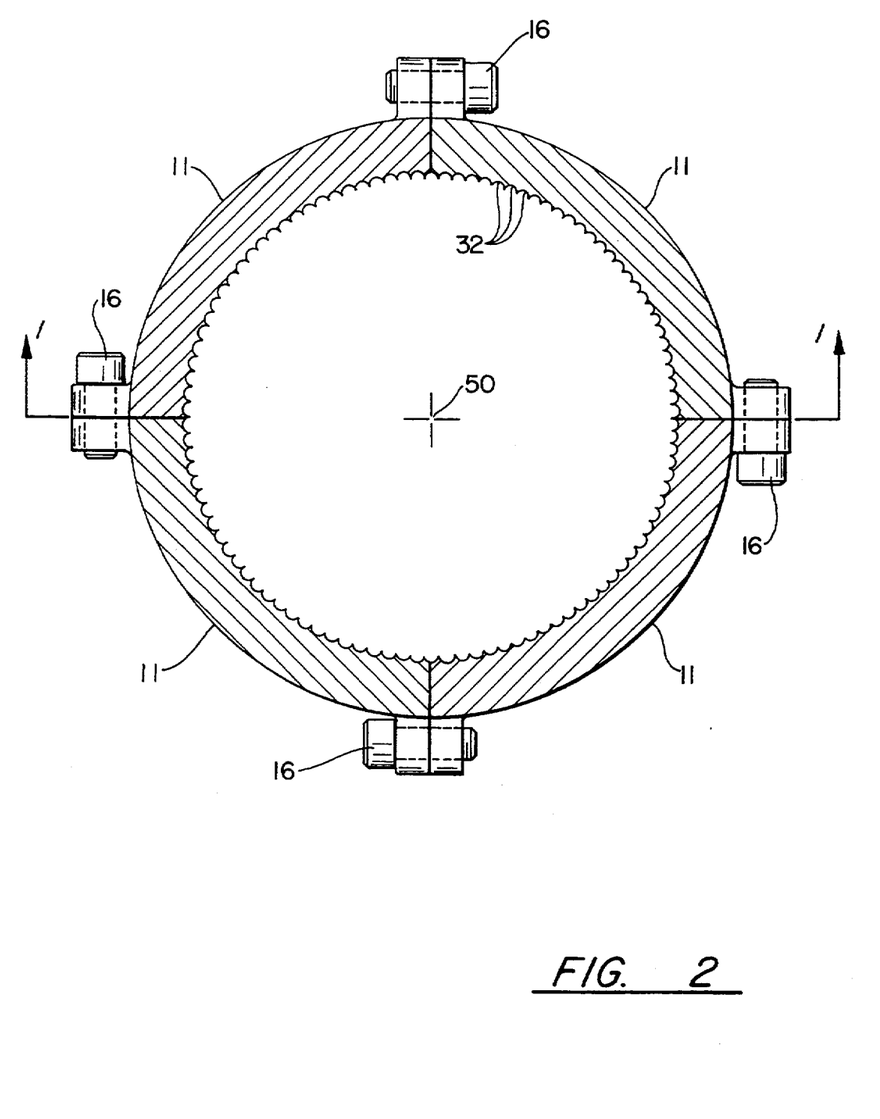
FIG. 2 is a cross-sectional view of the outer tooling fixture taken along line 2—2 of FIG. 1.

A outer tooling fixture 10 for forming a rocket thrust chamber is shown in FIG. 1 with an axial centerline axis 50 so defined therethrough. Although the present invention is shown and described in terms of a rocket thrust chamber, such discussion is exemplary only and is not intended to limit the scope of the claims, as those skilled in the art will readily appreciate that the present invention has application to a broad range of applications requiring tube bonding and forming. The outer tooling fixture 10 is made up of a of a plurality of segments 11, preferably four, which extend axially along the centerline. Each segment 11 also extends radially about the axial centerline 50 forming an arc equal to one fourth of the circumference of the outer tooling fixture 10, as shown in FIG. 2. Referring back to FIG. 1, each segment 11 has an inner surface 12 and an outer surface 13 radially outward from the inner surface 12, each surface 12, 13 extending between the axial ends 14, 15 of the outer tooling fixture 10. The inner surface 12 is scalloped with a plurality of troughs 32 extending along the centerline 50 thereof, as shown in FIG. 2, and the surface 12 is coated with a releasing agent. The outer tooling fixture 10 is made of one of the materials known in the art to have high strength at braze temperatures, and has several sets of fasteners 16, preferably bolts, for removably securing each of the segments 11 to adjacent segments 11, as shown in FIG. 2.

Figure 3:
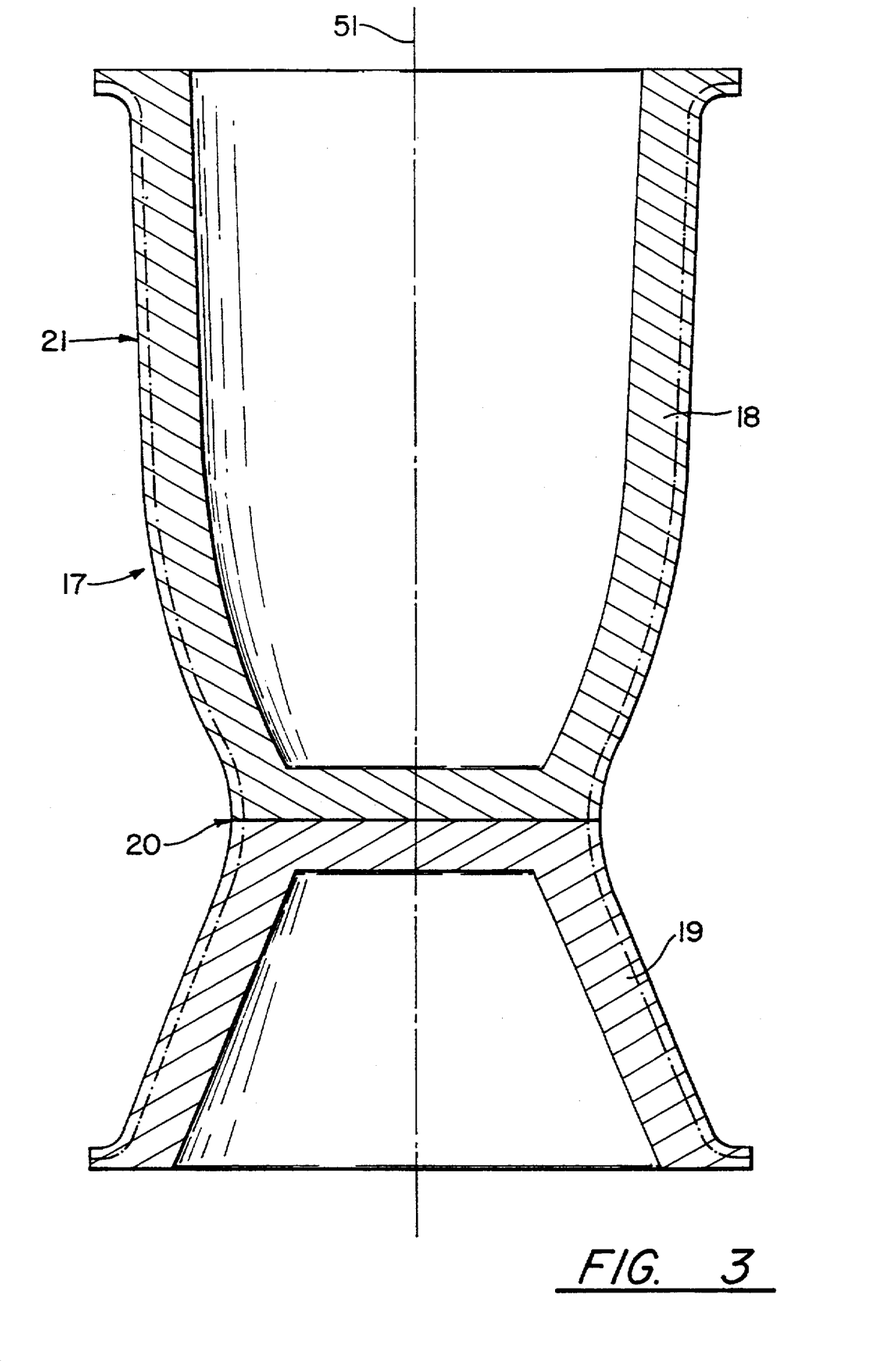
FIG. 3 is a cross-sectional view of the inner tooling fixture of the present invention.
Figure 4:
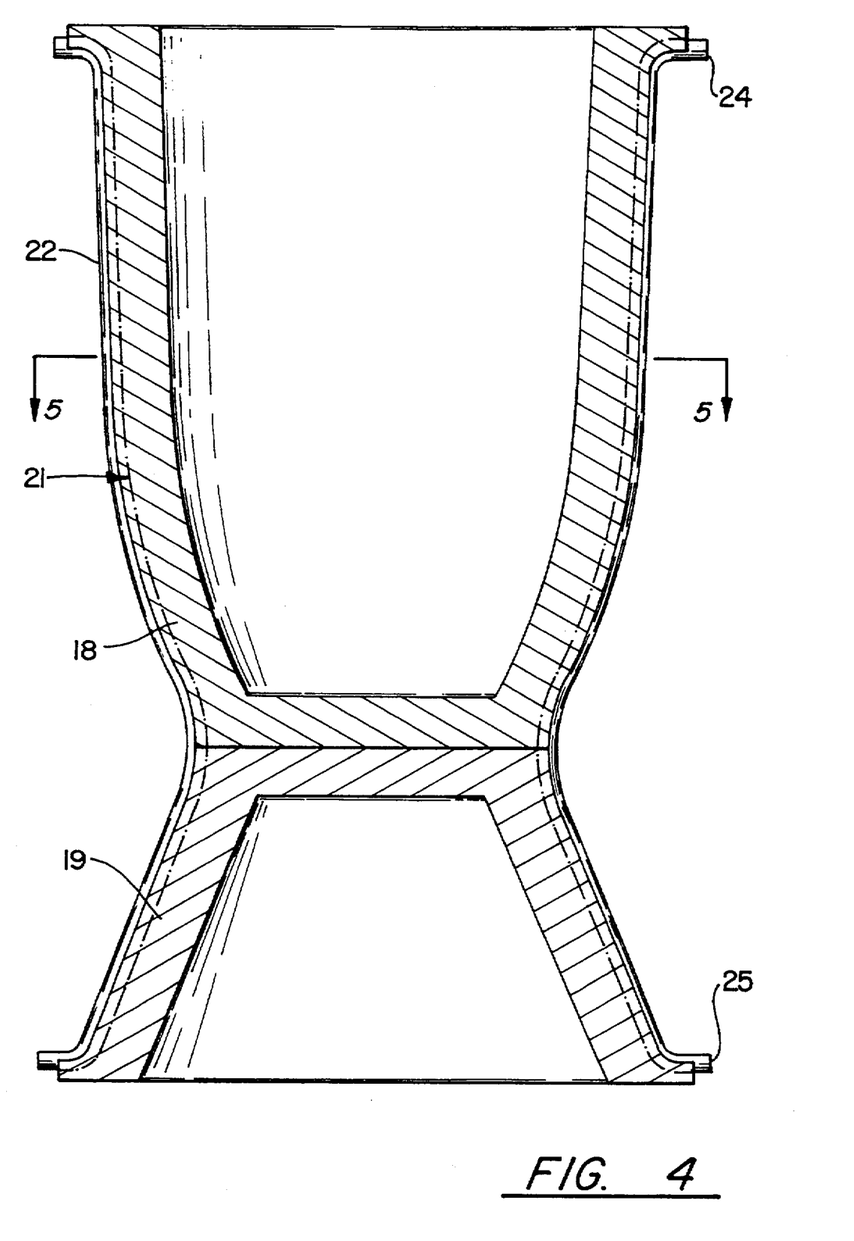
FIG. 4 is the view of FIG. 3 with the tubes positioned around the inner tooling fixture.
Figure 5:
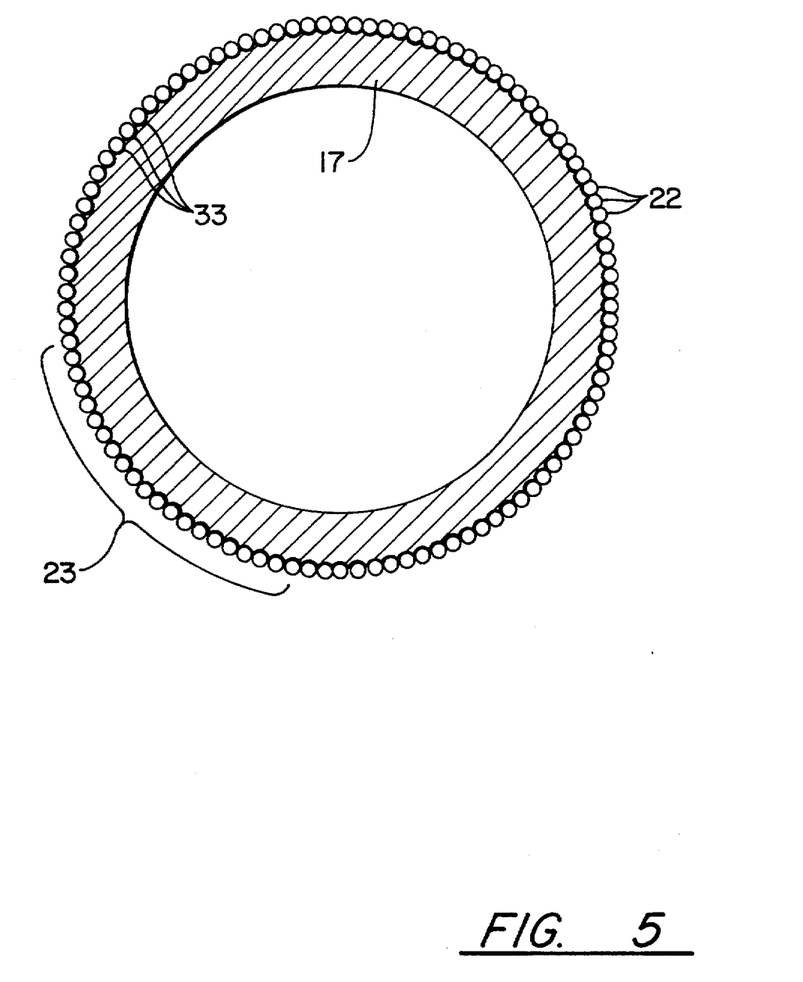
FIG. 5 is a cross-sectional view of the assembly in FIG. 4 taken along line 5—5.

An inner tooling fixture 17 having a longitudinal axis 51 defined therethrough has a first piece 18 which can be removably secured to a second piece 19, as shown in FIG. 3. The first piece 18 mates to the second piece 19 at the narrowest diameter 20 of the inner tooling fixture 17 along the longitudinal axis 51. The inner tooling fixture 17 has an outer surface 21 which is likewise scalloped with a plurality of troughs 33 extending along the longitudinal axis 51 thereto, and the outer surface 21 also is coated with a releasing agent. A plurality of tubes 22 are formed into a shape which conforms to the axial profile of the outer surface 21 of the inner tooling fixture 17, as shown in FIG. 4. The tubes 22 are preferably made of a high temperature or high conductivity material such as Inconel 625, Haynes 188, Haynes 230 or copper. With the two pieces 18, 19 of the inner tooling fixture 17 secured together, each of the tubes 22 is positioned circumferentially about the inner tooling fixture 17 so that each tube 22 extends axially along the inner tooling fixture 17. The axially aligned tubes 22 thus form a tube bundle 23 about the inner tooling fixture 17, a cross-section of which is shown in FIG. 5.

Figure 6:
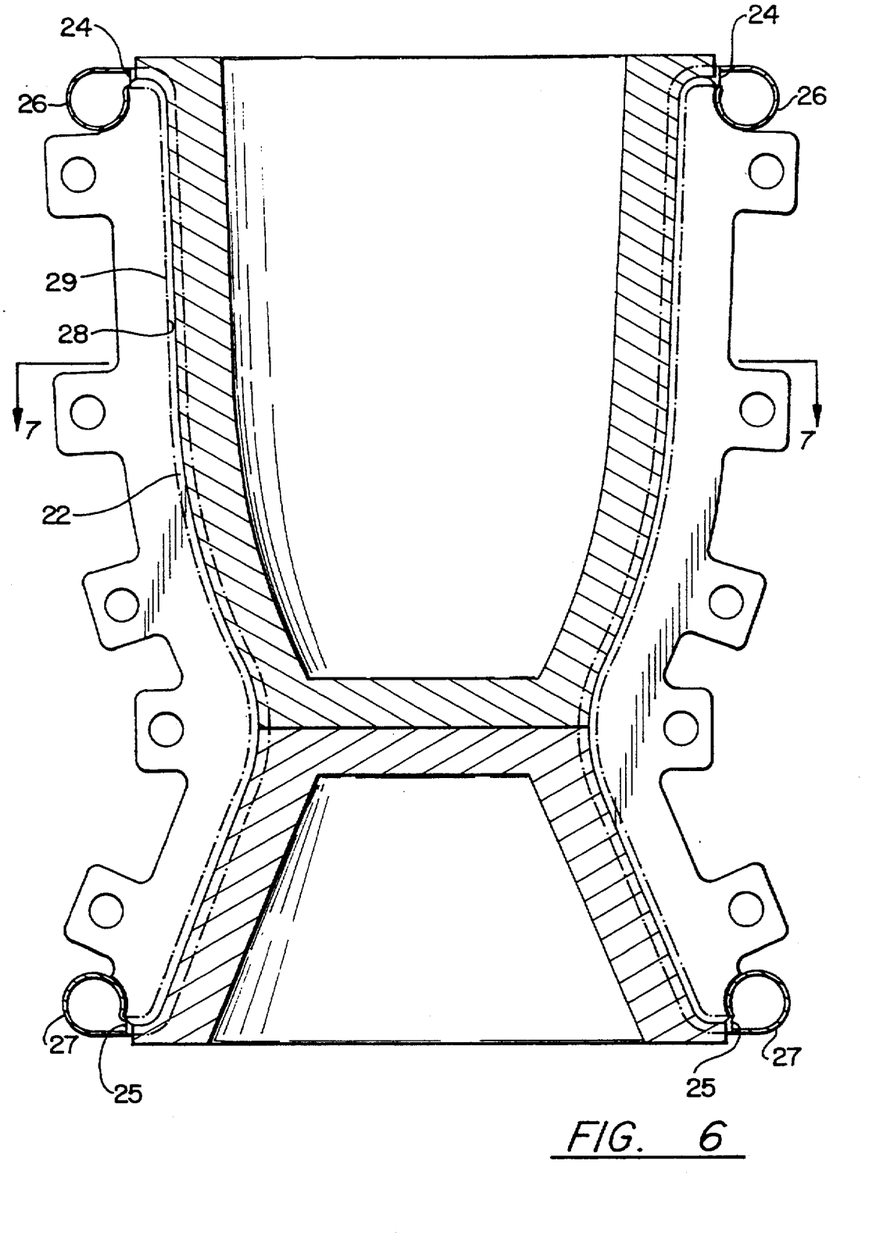
FIG. 6 is the cross-sectional view of FIG. 4 showing the manifolds and the tubes.

The ends 24, 25 of each tube 22 are then sealingly welded to a manifold 26, 27 so that the inside 28 of each tube 22 no longer communicates with the outside 29 thereof, as shown in FIG. 6. With the tubes 22 positioned about the inner tooling fixture 17, the segments 11 of the outer tooling fixture 10 are positioned about the tube bundle 23 encompassing the tube bundle 23 and the inner tooling fixture 17 with the inner surface 12 of each segment 11 facing and adjacent to the tube bundle 23. Each of the segments 11 is then bolted to the adjacent segments 11, thereby fixing the relative positions of the fixtures 10, 17 and the tubes 22. The resulting assembly 30 of the outer tooling fixture 10, the inner tooling fixture 17, and the tubes 22 are shown in cross-section in FIG. 7.

Figure 7:
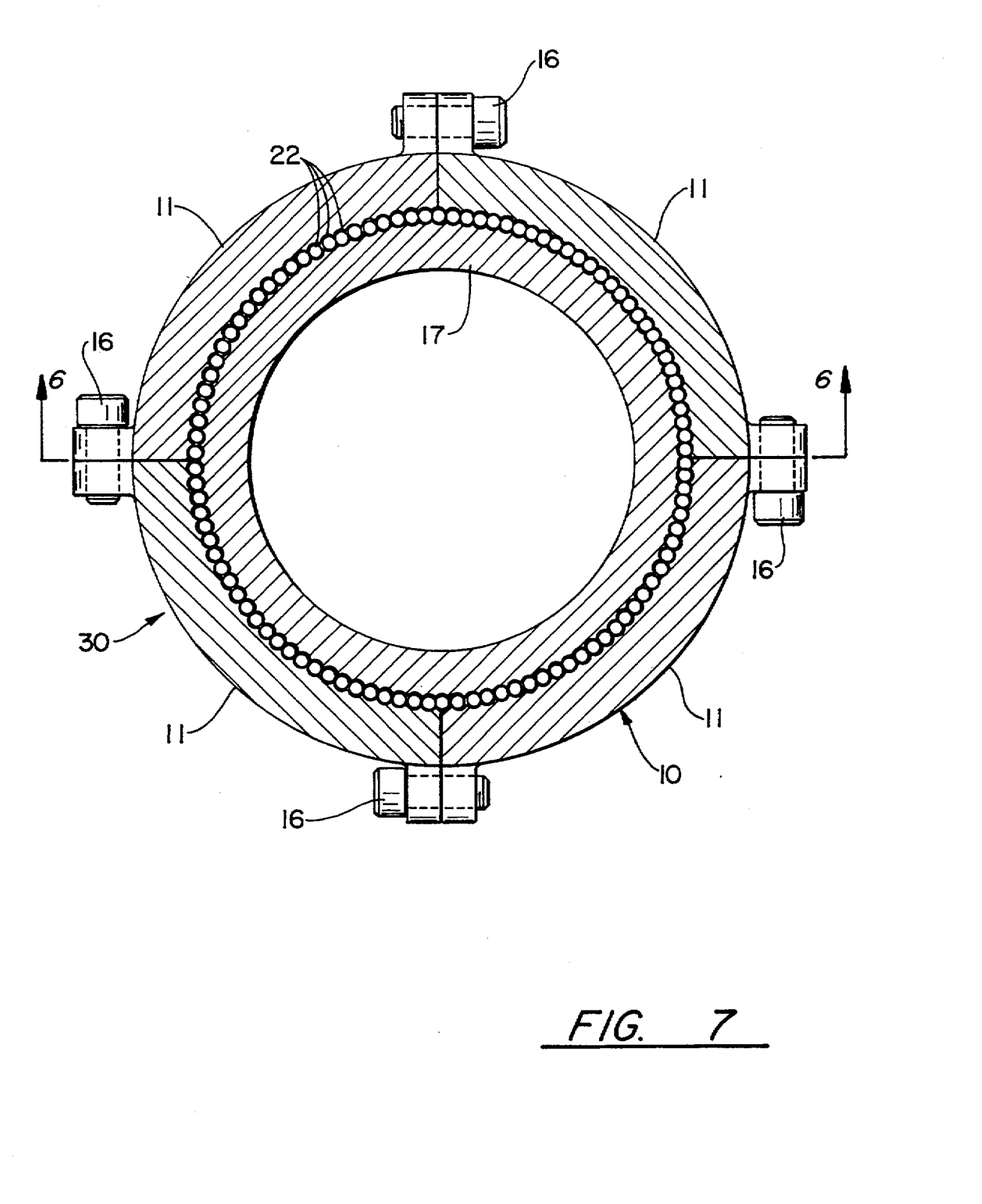
FIG. 7 is a cross-sectional view similar to FIG. 5 with the added outer tooling fixture.

At this point, the tubes 22 may be checked for leaks by pressurizing the manifolds 26, 27 with inert gas such as helium, and using detection equipment to determine whether helium is escaping from the tubes 22 or manifolds 26, 27. Once it has been determined that no leaks are present, the manifolds 26, 27 may be used to perform hydrogen scrub cycles. The assembly 30 is then heated to a high temperature (the actual temperature depending upon alloy) at which diffusion bonding of the tubes 22 can occur. The heat may be provided by heating elements incorporated into the inner tooling fixture 17, outer tooling fixture 10, or both. The manifolds 26, 27 are then pressurized to high pressure (i.e. in excess of 500 psia) preferably with argon gas, inflating the tubes 22 into intimate contact with each other and the fixtures.

Figure 8:
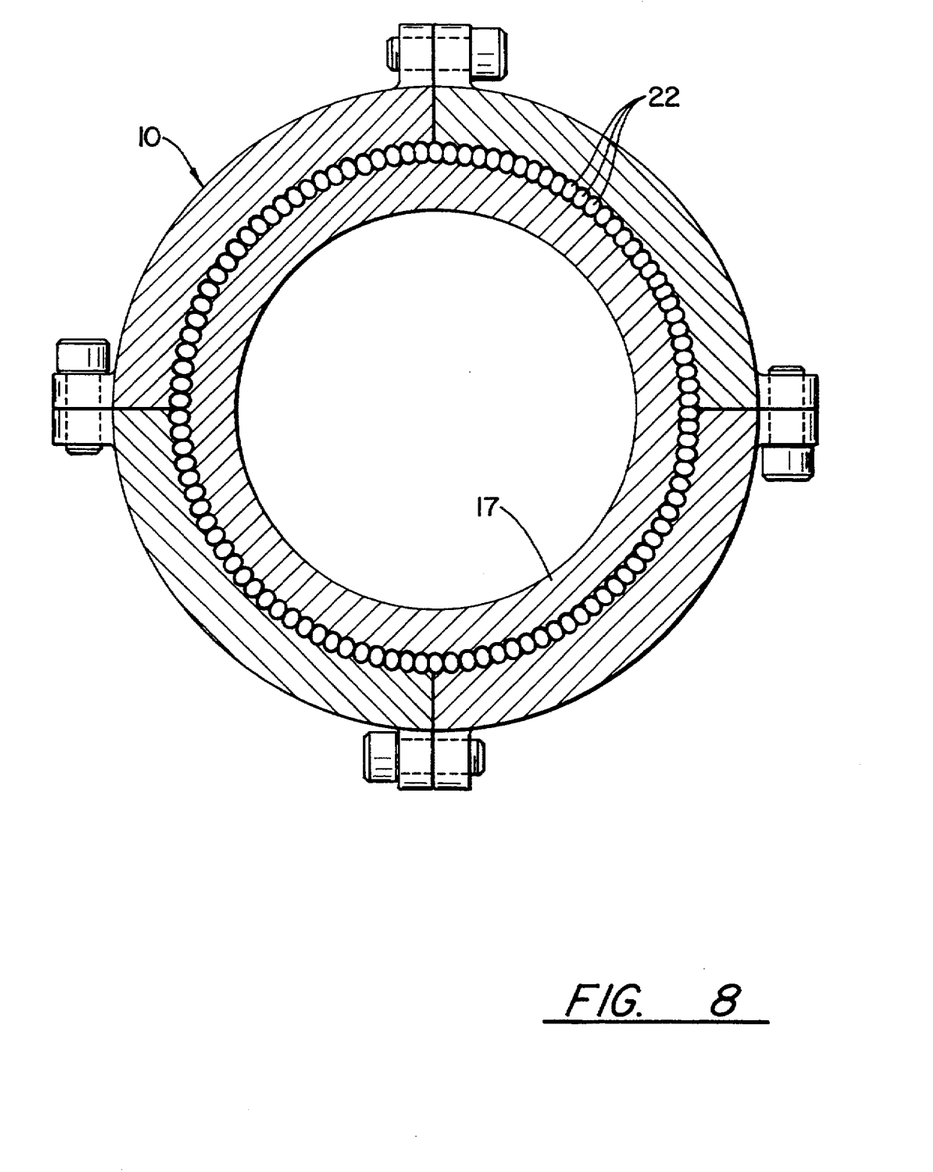
FIG. 8 is the view of the apparatus shown in FIG. 7 following deformation and bonding of the tubes.

The temperature is maintained until the tubes 22 diffusion bond to each other. The tubes 22 do not bond to the outer tooling fixture 10 and inner tooling fixture 17 because of the releasing agent which prevents the tubes 22 from bonding thereto. The resulting deformation is shown in FIG. 8. After the diffusion bonding is completed, the temperature is reduced to ambient and the pressure is released from the manifolds 26, 27 and the outer tooling fixture 10 and inner tooling fixture 17 are then removed from the tube bundle 23.

As an alternative to diffusion bonding, the tubes 22 may be coated with a braze material such as AuNi prior to positioning the tubes 22 about the inner tooling fixture 17. After pressurizing the tubes 22, the temperature is increased to braze temperature, thereby brazing the tubes 22 together. Likewise, a transient liquid phase enhancement material, such as boron, may be coated onto selected portions of the tubes 22, which may be made of a nickel alloy. If the selected portions of the tubes 22 are those portions where adjacent tubes 22 contact each other, the tubes 22 need only be heated to a temperature at which the coated portion liquifies, and then cooled to produce an integral rocket thrust chamber.

Figure 9:
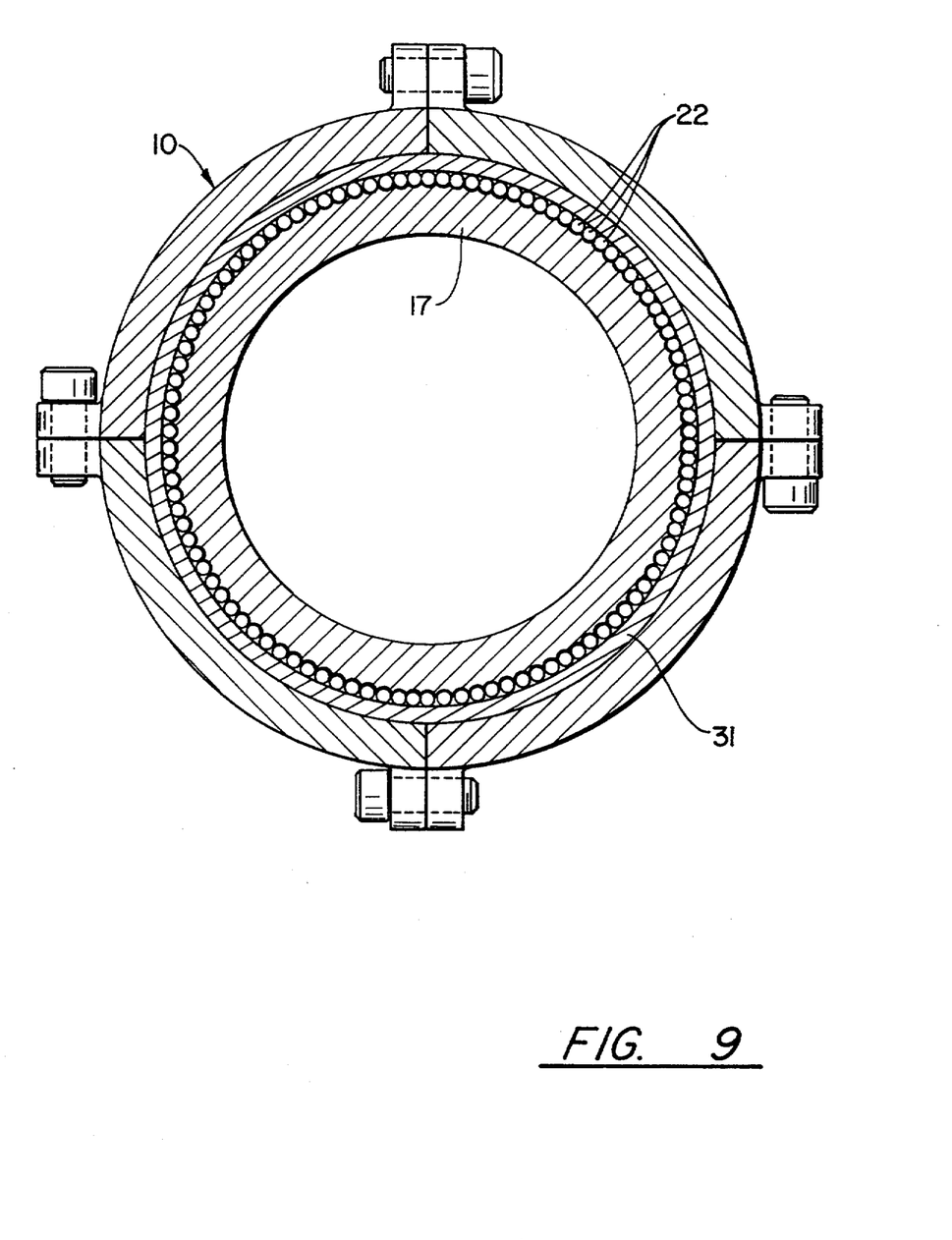
FIG. 9 is the view of the apparatus shown in FIG. 7 showing the structural jacket included therewith.

As an additional embodiment of the present invention, a structural jacket 31 may be incorporated into the rocket thrust chamber by placing each of the tubes 22 within the structural jacket 31 prior to positioning the tubes 22 about the circumference of the inner tooling fixture 17. The tubes 22 can then be positioned around the circumference of the inner tooling fixture 17 by placing the two pieces 18, 19 thereof within the jacket 31 with the tubes 22 sandwiched between the jacket 31 and the inner tooling fixture 17 as shown in FIG. 9. As those skilled in the art will readily appreciate, the jacket 31 and the outer tooling fixture 10 must have the same coefficient of thermal expansion to prevent deformation of the jacket 31 upon heating.

As those skilled in the art will readily appreciate, the materials used in some applications may not exhibit superplasticity, and therefore cannot be adequately inflated to provide the intimate contact between adjacent tubes 22 which is desired for the diffusion bonding. For those applications the inner tooling fixture 17 can be made of a material having a coefficient of thermal expansion which is greater than the coefficient of thermal expansion of the outer tooling fixture 10. As the outer tooling fixture 10 and inner tooling fixture 17 heat up, the inner tooling fixture 17 expands at a greater rate than the outer tooling fixture 10, thereby exerting considerable force on the tubes 22, forcing each tube 22 against adjacent tubes 22 and deforming the tubes 22 to a shape defined by the volume bounded between the outer tooling fixture 10 and the inner tooling fixture 17. The pressurized argon within each tube 22 prevents the tube 22 from collapsing, producing a circumferentially uniform deformation of the tubes 22.

Using the bonding operation of the present invention, a final shape can be formed within tight tolerances using tubes 22 that do not have to be manufactured to such tolerances. The bonding disclosed generates greater contact area between adjacent tubes 22 and ensures contact over the full length thereof, with the tube 22 final shape and bond width being controlled by the parameters of the process (i.e. fixture configuration, thermal coefficient of expansion, temperature, pressure, etc.). The present invention thus represents a substantial improvement over methods of the prior art.

Although this invention has been shown and described with respect to detailed embodiments thereof, it will be understood by those skilled in the art that various changes in form and detail thereof may be made without departing from the spirit and scope of the claimed invention.

I claim:

1. A method of making a tubular structure comprising:

providing a first tooling fixture having a centerline axis defined therethrough, said first tooling fixture comprising a plurality of segments which extend axially along the centerline and radially about the centerline, each segment having an inner surface, and an outer surface radially outward from said inner surface, said inner and outer surfaces extending between first and second axial ends of said first tooling fixture;

providing a second tooling fixture comprising a first piece which mates with a second piece, said second tooling fixture having a longitudinal axis, said second tooling fixture having a narrowest diameter along the longitudinal axis, and said first piece mates to said second piece at the narrowest diameter;

providing a plurality of tubes, each tube having a length great enough to extend between the two axial ends of the first tooling fixture, each tube shaped along the length thereof to conform to the inner surface between said first and second axial ends;

positioning each of said plurality of tubes about the circumference of the second tooling fixture encompassing the second tooling fixture, thereby forming a tube bundle about the second tooling fixture;

sealingly welding the end of each tube to a manifold;

positioning the plurality of segments about the tube bundle with the inner surface of each segment facing and adjacent to the tube bundle;

securing each segment to adjacent segments thereby fixing the relative positions of the first and second tooling fixtures and the tubes therebetween;

pressurizing each manifold thereby pressurizing each tube;

heating the first and second tooling fixtures and the tubes as an assembly to a temperature at which substantial plastic deformation of the tubes can take place; and, maintaining the pressure and temperature until each of the tubes bonds to the adjacent tubes.

2. The method of claim 1 wherein the first and second fixtures have a coating of release agent to prevent the tubes from bonding thereto.

3. The method of claim 2 wherein each of the tubes is plated with braze material prior to the step of positioning each of the tubes about the circumference of the second tooling fixture, and the step of maintaining the pressure and temperature is preceded by the step of:

heating the assembly to the braze temperature of the braze material.

4. The method of claim 2 wherein the step of maintaining the pressure and temperature is preceded by the step of:

heating the assembly to the a temperature at which the tubes diffusion bond together.

5. The method of claim 2 wherein each of the tubes is coated with a transient liquid phase enhancing material prior to the step of positioning each of the tubes about the circumference of the second tooling fixture, and the step of maintaining the pressure and temperature is preceded by the step of:

heating the assembly to the temperature at which the transient liquid phase enhancing material liquifies portions of each tube.

6. The method of claim 2 wherein the first tooling fixture has a lower coefficient of thermal expansion than the second tooling fixture.

7. The method of claim 3 wherein the step of positioning each of said plurality of tubes about the circumference of the second tooling fixture is preceded by the step of:

placing each of the tubes within a structural jacket.

8. The method of claim 7 wherein the step of positioning each of said plurality of tubes about the circumference of the second tooling fixture is accomplished by placing the pieces of the second tooling fixture within the jacket with the tubes sandwiched between the jacket and the second tooling fixture.

9. The method of claim 8 wherein the first tooling fixture and the jacket have equal coefficients of thermal expansion, and the second tooling fixture has a coefficient of thermal expansion greater than the first tooling fixture.

10. The method of claim 4 wherein the step of positioning each of said plurality of tubes about the circumference of the second tooling fixture is preceded by the step of:

placing each of the tubes within a structural jacket.

11. The method of claim 10 wherein the step of positioning each of said plurality of tubes about the circumference of the second tooling fixture is accomplished by placing the pieces of the second tooling fixture within the jacket with the tubes sandwiched between the jacket and the second tooling fixture.

12. The method of claim 11 wherein the first tooling fixture and the jacket have equal coefficients of thermal expansion, and the second tooling fixture has a coefficient of thermal expansion greater than the first tooling fixture.

13. The method of claim 5 wherein the step of positioning each of said plurality of tubes about the circumference of the second tooling fixture is preceded by the step of:

placing each of the tubes within a structural jacket.

14. The method of claim 13 wherein the step of positioning each of said plurality of tubes about the circumference of the second tooling fixture is accomplished by placing the pieces of the second tooling fixture within the jacket with the tubes sandwiched between the jacket and the second tooling fixture.

15. The method of claim 14 wherein the first tooling fixture and the jacket have equal coefficients of thermal expansion, and the second tooling fixture has a coefficient of thermal expansion greater than the first tooling fixture.

* * * * *

UNITED STATES PATENT AND TRADEMARK OFFICE
CERTIFICATE OF CORRECTION

PATENT NO. : 5,371,945
DATED : December 13, 1994
INVENTOR(S) : Richard J. Schnoor It is certified that error appears in the above-indentified patent and that said Letters Patent is hereby corrected as shown below:

In column 2, line 27, change "view:" to --view--.
In column 2, line 47, change "are" to --arc--.

Signed and Sealed this

Twenty-third Day of May, 1995

Attest:

BRUCE LEHMAN

Attesting Officer        Commissioner of Patents and Trademarks